Reissued Apr. 9, 1935

Re. 19,526

UNITED STATES PATENT OFFICE 19,526

COATING COMPOSITION

William Koch, Wilmington, Del., assignor to Hercules Powder Company, Wilmington, Del., a corporation of Delaware No Drawing. Original No. 1,950,894, dated March 13, 1934, Serial No. 626,225, July 29, 1932. Application for reissue January 11, 1935, Serial No. 1,442

20 Claims. (Cl. 134—17)

This invention relates to an improvement in coating compositions and more particularly to coating compositions which, while adaptable for use generally, lend themselves especially for use where a corrosion and abrasion resistant coating is desired, as for example, various metal surfaces, pipes to be buried in the ground, etc., etc.

Coating compositions in accordance with this invention will contain essentially chlorinated rubber and a chlorinated diphenyl, the latter acting to plasticize the former. The composition, however, may contain various other ingredients, which are compatible with the essential ingredients, in various proportions, depending upon the particular characteristics desired for the compositions with respect, for example, to their use, and they will contain a suitable solvent or solvent mixture for the essential ingredients.

The chlorinated rubber comprising one of the ingredients of the coating compositions in accordance with this invention may be either chlorinated raw rubber or chlorinated vulcanized rubber, or mixtures thereof, both being contemplated as within the term "chlorinated rubber" as used herein. While the chlorinated rubber will preferably have a relatively high percentage of chlorine, say about 67%, it will be understood that rubber containing any substantial percentage of chlorine, say as low as 50%, will be usable.

The chlorinated rubber, either raw or vulcanized, may be obtained from any source, or may be produced in any suitable manner. Thus, for example, suitable chlorinated rubber may be produced from raw or vulcanized rubber by dissolving the rubber in a solvent, as carbon tetrachloride, which will be unaffected by chlorine, heating the solution to a temperature within the range 80–100° C. and introducing chlorine into the heated solution. Where vulcanized rubber is treated the sulphur will be separated out by the chlorine, appearing as a chloride of sulphur, all, as for example, is more fully disclosed in U. S. Patent No. 1,852,043 to Deseniss and Nielson.

Other methods for the production of suitably chlorinated rubber are disclosed, for example, in the United States patents to Carlton Ellis No. 1,544,530 and No. 1,544,529, to Peachy No. 1,234,381 and to Deseniss and Nielson No. 1,852,043. It will, of course, be understood that suitably chlorinated rubber for use in connection with this invention may be produced in any desired manner, the references made herein being for illustrative purposes only.

The chlorinated diphenyl comprising an ingredient of the coating compositions in accordance with this invention may be of any suitable type, either liquid or solid, but preferably of a relatively non-volatile type. By way of illustration the chlorinated diphenyl may be one or another of the various chlorinated diphenyls known as aroclors and may, for example, be Aroclor 1254, a liquid, Aroclor 1268, a solid, etc., etc.

The composition will contain, in addition to chlorinated rubber and a chlorinated diphenyl, a suitable solvent or solvent mixture whereby the essential ingredients will be blended and a solution formed of viscosity or fluidity such as to enable its application to a surface to be coated, as by brushing, spraying, dipping, or otherwise. The solvent or solvent mixture will desirably be of a volatile nature and will act as a vehicle, being wholly or largely removed by, for example, evaporation after application of the composition to a surface for the formation of a film. The solvent may be of any suitable type for the purpose, as, for example, a mixture of xylol and toluol, monoalkylated either of ethylene glycol, ethylene dichloride, ethyl acetate, etc., etc. The solvent will desirably be a solvent for other ingredients which may be included in the composition, and will be used in amount with relation to the ingredients to be dissolved such as to give the viscosity or fluidity desired.

In addition to the essential ingredients, chlorinated rubber and a chlorinated diphenyl, the composition, as has been indicated, may contain various other ingredients, as for example, a resin, etc., coumarone resin, ester gum, a drying oil, such as linseed oil, China-wood oil, etc., a plasticizer, as dibutyl phthalate, or the like, pigments, etc., etc. Ingredients which may be included in the composition, in addition to chlorinated rubber and chlorinated diphenyl, may be included in varying amount as may be dictated by the characteristics of additional ingredients and the purpose for which any given composition is intended.

As illustrative of compositions in accordance with this invention, for example, satisfactory compositions for various uses, and with and without ingredients other than those indicated as essential, may be made up on the following formulæ:

| Formula No. | 1 | 2 | 3 | 4 |
|---|---|---|---|---|
| Chlorinated rubber | 10 | 10 | 10 | 10 |
| Aroclor 1254 liquid (chlorinated diphenyl, 54 percent chlorine) | 5 | ------ | 2 | 2 |
| Aroclor 1268 solid resin (chlorinated diphenyl, 68 percent chlorine) | ------ | 5 | 3 | ------ |
| Coumarone | ------ | ------ | ------ | 3 |
| Xylol | 28 | 28 | 28 | 28 |
| Toluol | 57 | 57 | 57 | 57 |

Coating compositions in accordance with the above formulæ will be found variously advantageous for various purposes and, more particularly, for the formation of films or coatings on metal surfaces which will be corrosion and abrasion resistant.

As will be obvious, the compositions in accordance with this invention may be applied to surfaces by spraying, brushing, dipping, or the like, and the actual coating or film will be formed by removal of the solvent or volatile ingredients, as by evaporation or otherwise.

What I claim and desire to protect by Letters Patent is:

1. A coating composition including chlorinated rubber, a chlorinated diphenyl and a solvent.

2. A coating composition including chlorinated rubber, a chlorinated diphenyl, a plasticizer and a solvent.

3. A coating composition including chlorinated rubber, a chlorinated diphenyl, a resin and a solvent.

4. A coating composition including chlorinated rubber, a chlorinated diphenyl, a drying oil and a solvent.

5. A coating composition including chlorinated rubber, a chlorinated diphenyl, a resin, a drying oil and a solvent.

6. A coating composition including chlorinated rubber about 10%, a chlorinated diphenyl about 2–5% and a solvent.

7. A coating composition including chlorinated rubber about 10%, a chlorinated diphenyl about 2–5% and a solvent about 85%.

8. In combination a surface and a film containing chlorinated rubber and a chlorinated diphenyl adhered to and supported on said surface.

9. In combination a metallic surface and a film containing chlorinated rubber and a chlorinated diphenyl adhered to and supported on said surface.

10. A coating composition including chlorinated rubber and chlorinated diphenyl containing about 54% chlorine and a solvent.

11. A coating composition including chlorinated rubber and chlorinated diphenyl containing about 68% chlorine and a solvent.

12. A composition including in admixture chlorinated rubber and a chlorinated diphenyl.

13. A composition including in admixture chlorinated rubber, a chlorinated diphenyl and a plasticizer.

14. A composition including in admixture chlorinated rubber, a chlorinated diphenyl, a resin and a plasticizer.

15. A composition including in admixture chlorinated rubber, chlorinated diphenyl and a resin.

16. A composition including in admixture chlorinated rubber, chlorinated diphenyl and a drying oil.

17. A composition including in admixture chlorinated rubber, chlorinated diphenyl and dibutyl phthalate.

18. A composition including in admixture chlorinated rubber and a chlorinated diphenyl containing 54%–68% chlorine.

19. A composition including in admixture chlorinated rubber containing 50%–67% chlorine and a chlorinated diphenyl.

20. A composition including in admixture chlorinated rubber containing 50%–67% chlorine and a chlorinated diphenyl containing 54%–68% chlorine.

WILLIAM KOCH.